(12) United States Patent
Ekström

(10) Patent No.: US 6,299,085 B1
(45) Date of Patent: Oct. 9, 2001

(54) CUTTING DEVICE FOR FOOD PROCESSING MACHINES

(75) Inventor: Ulf Ekström, Täby (SE)

(73) Assignee: AB Hällde Maskiner, Kista (SE)

( * ) Notice: Subject to any disclaimer, the term of this patent is extended or adjusted under 35 U.S.C. 154(b) by 0 days.

(21) Appl. No.: 09/720,856

(22) PCT Filed: Jun. 23, 1999

(86) PCT No.: PCT/SE99/01137
§ 371 Date: Feb. 12, 2001
§ 102(e) Date: Feb. 12, 2001

(87) PCT Pub. No.: WO00/01287
PCT Pub. Date: Jan. 13, 2000

(30) Foreign Application Priority Data

Jul. 2, 1998 (SE) .................................................. 9802375

(51) Int. Cl.[7] .............................. A23L 1/00; A47J 43/06; B02C 18/08; B02C 18/12; B02C 18/24
(52) U.S. Cl. .................... 241/282.1; 99/492; 99/509; 99/510; 241/37.5; 241/101.2; 241/199.12; 366/314
(58) Field of Search ............................. 99/492, 509–513, 99/348; 241/282.1, 101.2, 98, 92, 100, 101.6, 101.8, 199.7, 199.12, 277, 282.2; 366/314, 144–146, 601, 205, 274, 294

(56) References Cited

U.S. PATENT DOCUMENTS

| D. 421,546 | 3/2000 | Ekström | D7/412 |
|---|---|---|---|
| 2,284,155 | * 5/1942 | Landgraf | 241/282.1 X |
| 3,024,010 | * 3/1962 | Sperling | 366/314 X |
| 3,156,278 | * 11/1964 | Otto | 241/282.2 |
| 4,613,086 | * 9/1986 | Granum et al. | 241/101.2 X |
| 4,752,041 | 6/1988 | Franke et al. | 241/282.1 |
| 4,784,338 | * 11/1988 | Saladin | 241/199.7 X |
| 5,271,572 | * 12/1993 | Grandi | 241/199.12 X |
| 5,823,672 | * 10/1998 | Barker | 366/314 X |
| 6,012,837 | * 1/2000 | Thuma | 99/348 X |
| 6,095,677 | * 8/2000 | Karkos, Jr. et al. | 366/274 |
| 6,164,196 | * 12/2000 | Deschamps et al. | 99/492 X |
| 6,189,441 | * 2/2001 | Beaudet et al. | 99/510 X |

FOREIGN PATENT DOCUMENTS

| 837300 | 8/1951 | (DE) . |
|---|---|---|
| 2412765 | 10/1974 | (DE) . |
| 29612865 | 11/1996 | (DE) . |
| 0 570 677 A1 | 11/1993 | (EP) . |

* cited by examiner

Primary Examiner—Timothy F. Simone
(74) Attorney, Agent, or Firm—Alfred J. Mangels

(57) ABSTRACT

A cutting device for food processors wherein the processor is a cutting machine for cutting or chopping raw foodstuffs. The machine includes a container. A cutting device that includes a central sleeve-like part is non-rotatably fitted to a driven shaft and carries a cutting tool at its lower end, the cutting tool including knives that extend radially outwards from the sleeve. The cutting device includes a first pair of knives with respective knives extending radially from opposite sides of the central part close to the bottom of the central part. At least one second knife projects radially outwards from the central part higher up from the bottom of the central part than the first pair of knives. The second knife has a shorter bade than the knives of the first pair.

7 Claims, 2 Drawing Sheets

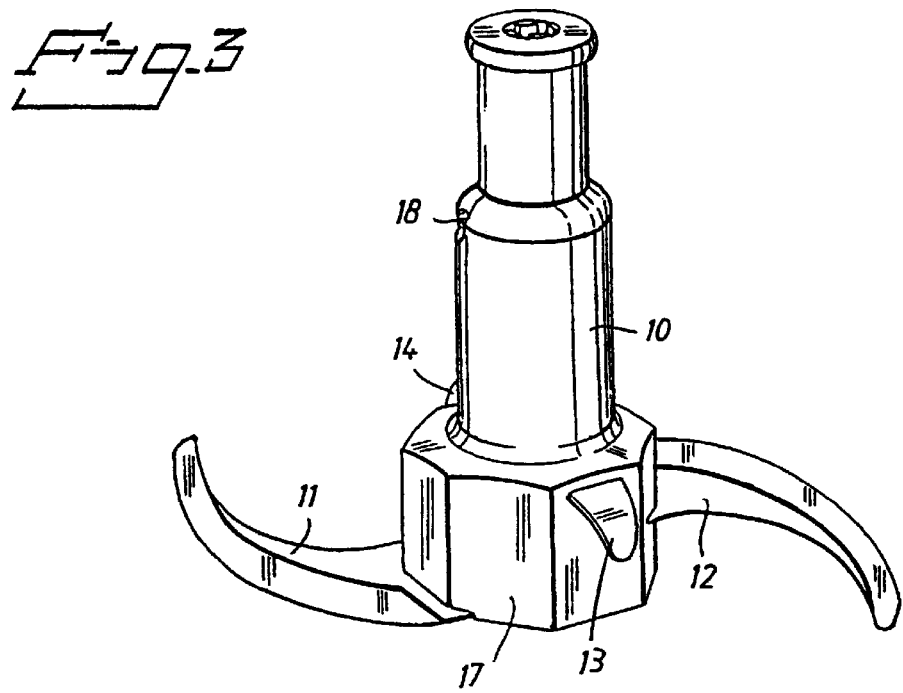
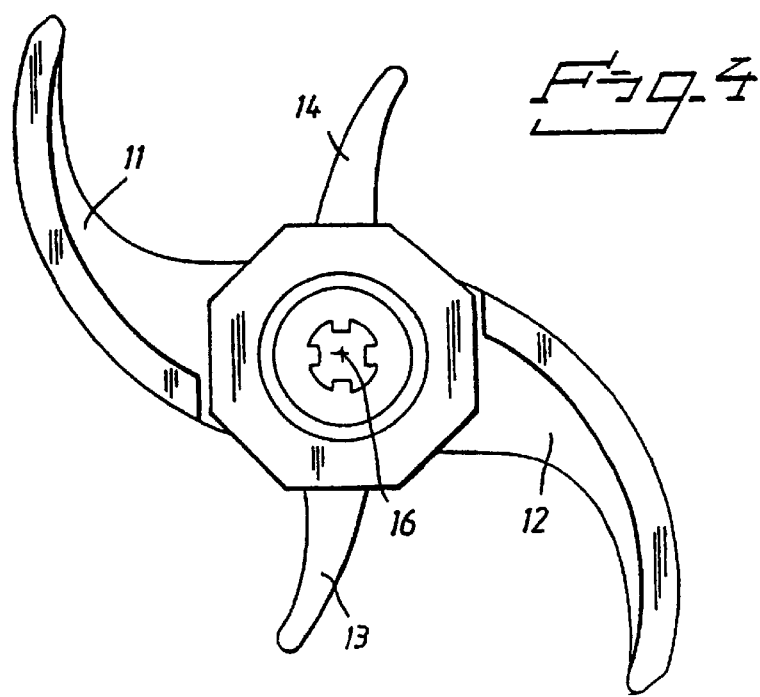

CUTTING DEVICE FOR FOOD PROCESSING MACHINES

BACKGROUND OF THE INVENTION

1. Field of the Invention

The present invention relates to a cutting device for food processors of the kind in which the processor is designed as a cutting machine for cutting or chopping the raw foodstuffs to be prepared.

2. Description of the Related Art

Machines of this kind are available in designs for use in industrial kitchens and also in designs for domestic use.

A common feature of the machines is that they include a container which is fitted with a lid that has an infeed opening which allows raw foodstuffs to be inserted into the container while the machine is in operation. A tubular member which accommodates a driven shaft extends up from the bottom of the container. A cutting device is non-rotatably fitted to the shaft. The cutting device also includes a sleeve-like central part which runs on the outside of the upstanding tubular member and which carries the cutting tool at its lower end. The cutting tool may consist of one or more knives that extend radially outwards from the sleeve. The container is held stationary while the cutting device rotates, when the machine is in use.

One problem with food processors of this kind is that certain types of ingredients to be processed by the knives tend to fasten to the outer surface of said central part, causing the mass of ingredients to rotate together therewith.

An example of such agglomerated masses is found in different types of meat that are to be chopped or cut with the aid of the knives. For instance, meat that is minced tends to form a ball that sticks firmly to the outer surfaces of the central part and to the inner surface of the container. Consequently, the ball will only rotate around a horizontal axis to a relatively small extent.

This poor rotation of the ball means that the meat will be cut unevenly, while poor rotation of the meat about a horizontal axis will means that the knives will cut through meat that has already been cut, causing a local increase in meat temperature, which is highly disadvantageous with respect to the quality of the food prepared.

The same problem occurs with other types of food masses that can form a more or less sticky ball, such as fish mince, dough, etc.

Another problem is that when such food processors are used to produce puree, mash, soup and like foods, there is insufficient vertical flow of the foodstuff in the container.

Another problem with such food processors is that certain liquid products are filled to a level in the container above the orifice of the tubular member upstanding from the bottom of the container. As a result the liquid food product rises up in the space between the outer surface of the upstanding tubular member and the inner surface of the central part and runs down in the space between the upstanding tubular member and the drive shaft. The food product then runs out through the lower orifice of the upstanding tubular member and thus out beneath the container. As a result of the siphoning effect that occurs, most of the food product will run out of the container along this path unless the processor is stopped and the container lifted-off.

The present invention solves these problems.

SUMMARY OF THE INVENTION

The present invention thus relates to a cutting device for food processors of the kind where the processor is a cutting machine for cutting or chopping raw foodstuffs to be processed. The machine includes a container which is fitted with a lid and which is stationary during operation of the machine. A tubular member extends up from the container bottom, and a driven shaft extends through said tubular member. A cutting device is non-rotatably mounted on said shaft and includes a sleeve-like central part on the outside of the outwardly extending tubular member that carries said cutting tool at its lower end. The tool includes one or more knives that extend radially outwards from the sleeve. The cutting device includes a first pair of knives placed radially on opposite sides of the central part and close to the bottom thereof, and at least one second knife which projects radially outwards from said central part than the first pair of knives. The second knife has a shorter cutting blade than the first pair of knives.

BRIEF DESCRIPTION OF THE DRAWINGS

The invention will now be described in more detail with reference to exemplifying embodiments thereof and also with reference to the accompanying drawings, in which

FIG. 3 illustrates the inventive cutting device; and

FIG. 4 shows said device from beneath.

DESCRIPTION OF THE PREFERRED EMBODIMENTS

Figure 1:
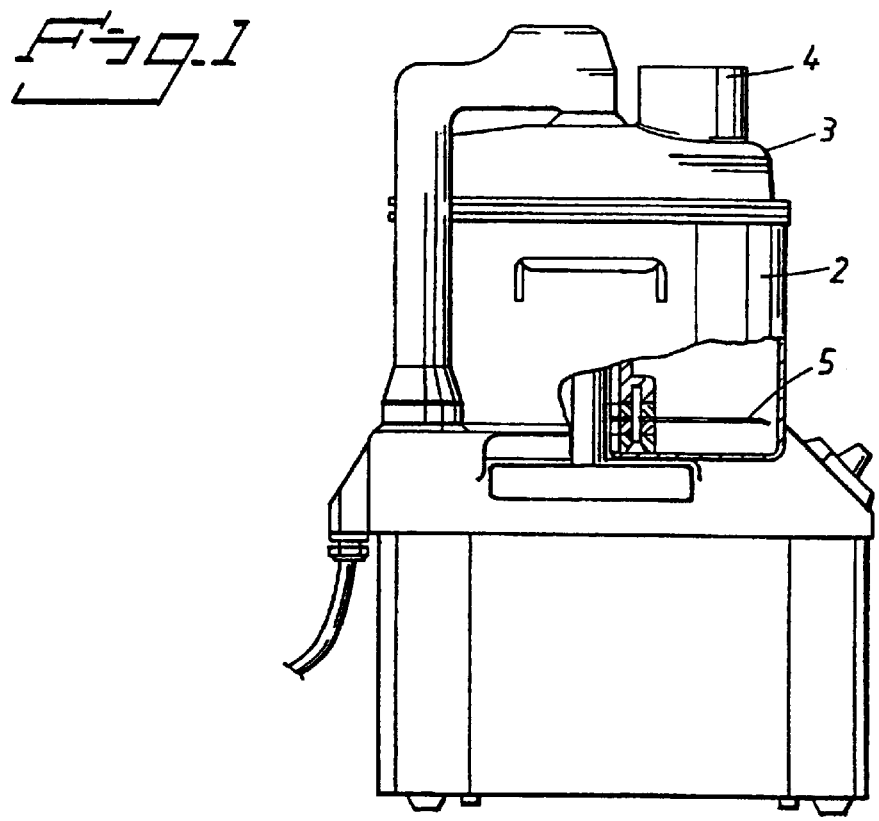
FIG. 1 is a partially cut-away view of a food processor of the kind with which the invention is utilized.

FIG. 1 illustrates a food processor in the form of a machine for cutting or chopping raw foodstuffs to be processed. The machine includes a container 2 which is fitted with a lid 3 that includes an infeed opening 4 through which raw foodstuffs can be inserted into the whilst while the machine is operating. A rotary cutting device 5 is mounted above the container bottom. The present invention is intended for application with this type of food processor.

Figure 2:
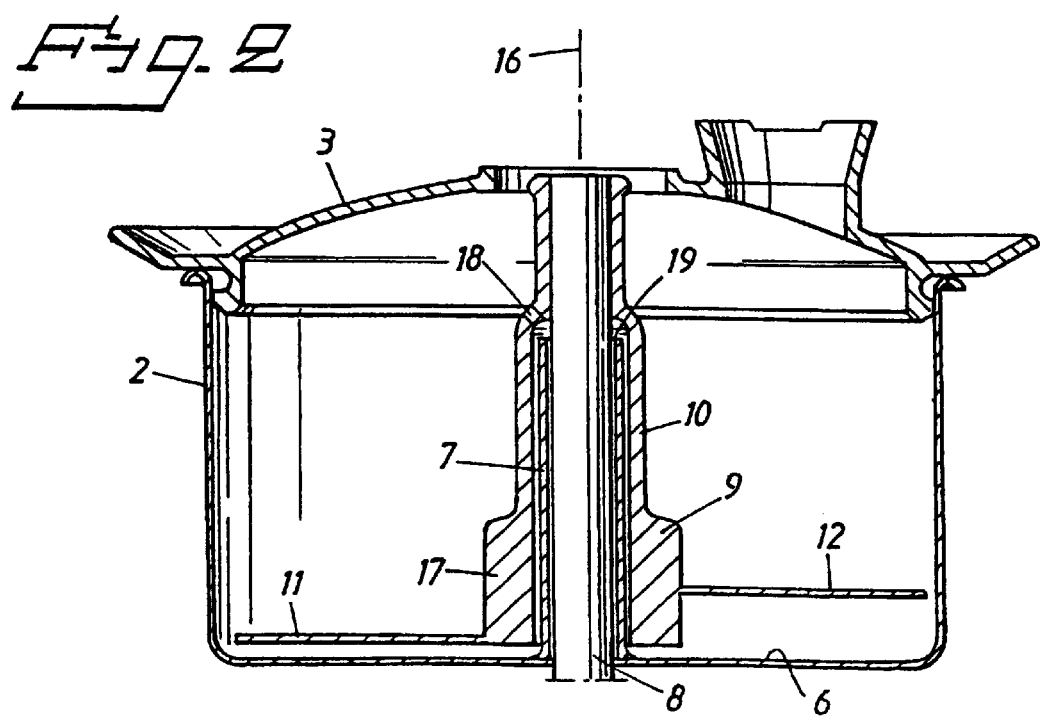
FIG. 2 is a sectional view of a food processor equipped with an inventive cutting device.

Food processors of this kind include a tubular member 7 which extends up from the container bottom 6 and through which a driven shaft 8 extends (see FIG. 2), said shaft 8 having non-rotatably fitted thereto a cutting device 9 which includes a sleeve-like central part 10 located on the outside of the upwardly extending tubular member 7, and which consists of one or more knives 11, 12 that extend radially outwards from the sleeve-like part 10.

In accordance with the invention, the cutting device includes a pair of first knives 11, 12 that are placed radially on opposite sides of the central part 10 and close to the bottom thereof. The cutting device further includes at least one second knife 13 which projects radially out from the central part 10 at a position which is higher up from the bottom of the central part than the pair of first knives 11, 12, said second knife 13 having a shorter blade than the pair of first knives 11, 12.

According to one highly preferred embodiment of the invention, the cutting device includes a pair of second knives 13, 14 instead of one single second knife 13. The knives 13, 14 of this second pair are placed radially on respective opposite sides of the central part 10 and at a higher position from the bottom of the central part than the pair of first knives. The drawings show only this latter embodiment.

The pair of first knives 11, 12 is suitably positioned so that the knives will run only a few millimeters above the container bottom 6, perhaps a centimeter, when the machine is being used. The second knife 13 or the pair of second knives 13, 14 is placed one or more centimeters above the first pair of knives.

As shown in FIG. 4, the two pairs of knives are offset in relation to one another in a direction that coincides with the longitudinal axis 16 of the central part 10. The knife blades are preferably placed equidistantly around the periphery of the central part. The blades of the second knife pair 13, 14 are shorter than the blades of the first knife pair 11, 12.

The primary function of the cutting device is to prevent foodstuff in the container of the processor from sticking to the central part 10, which rotates when the machine is running. The foodstuff will be cut by the second knife or the second knife pair 13, 14, although the second knife or second knives will not cut through the whole of the mass but solely through a part thereof. This has been found to generate greater rotation of the mass around a horizontal axis and also around a vertical axis.

This greater rotation of the foodstuff mass means that the knives will process the mass more uniformly than would otherwise be the case. As a result, the knives will not work the mass in one and the same place so as to result in local temperature elevation.

According to one preferred embodiment, the second knife 13 or the knives in the pair of second knives 13, 14 have a length which is roughly half the length of the knives in the pair of first knives 11, 12. This results in very good rotation of the food mass.

In accordance with another preferred embodiment, the cutting edge of the second knife 13 or the knives 13, 14 of the pair of second knives is ground solely on the underside of the respective knives to provide the cutting edge and is thus inclined to the direction of movement of the knife or knives when the machine is being used.

According to yet another preferred embodiment, the knife 13 or the knives 13, 14 of the pair of second knives is/are angled to a plane which extends perpendicular to the longitudinal axis of the central part.

These latter two embodiments contribute in achieving a further increase in rotation of a food mass around a horizontal axis.

With regard to liquid products, these embodiments result in a strong vertical flow of the product in the container, in a radial plane that coincides with the longitudinal axis of the central part.

In one highly preferred embodiment, at least the lower part 17 of the central part 10, where respective pairs of knives 11, 12, 13, 14 are placed, has a square, hexagonal or octagonal shape in a section taken perpendicularly to the longitudinal axis 16 of the central part. When the machine includes two pairs of knives, the lower part 17 will have a square or octagonal cross-section at the location of said two knife pairs. Three pairs of knives can be fitted when the lower part 17 has an hexagonal cross-section, with one knife attached to each side of the hexagon.

Food masses that tend to stick to the central part will also tend to spin with the central part in the container, when said central part has a circular cross-section. One advantage afforded by a lower part 17 that has the aforesaid configuration, other than circular, is that such food masses are unable to adhere to said central part and therewith be carried thereby.

According to one highly preferred embodiment of the central part 10, said part is provided with a through-penetrating radial hole 18 at a level on which the cutting device is mounted in the container 2, this level being higher than the level of the upper orifice 19 of the tubular member 7 upstanding from the container bottom 6. Because air is able to flow in through the hole 18, the aforementioned siphoning effect can no longer occur in the case of a liquid product that rises up in the space between the inner surface of the central part 10 and the inside of the upstanding tubular member 7.

The present invention thus solves the problems mentioned in the introduction.

Although the invention has been described with reference to a number of exemplifying embodiments thereof, it will be understood that the invention can be modified with respect to the design of the knives and their number.

The present invention is therefore not restricted to the aforedescribed embodiments, since modifications and variations can be made within the scope of the following claims.

What is claimed is:

1. A cutting device for food processors of the kind where the processor is a cutting machine for cutting or chopping raw foodstuffs to be processed, wherein the machine includes a container that is fitted with a lid and which container is stationary during operation of the machine, a tubular member which extends up from the container bottom and through which a driven shaft extends, wherein there is non-rotatably fitted to the shaft a cutting device comprising: a central sleeve-like part that can be received on the outside of the upstanding tubular member and that carries a cutting tool at its lower end, said cutting tool including knives which extend radially outwards from the sleeve-like part, wherein the cutting device includes a first pair of knives with respective knives of said pair extending radially from opposite sides of the central part close to a bottom of said central part, and further includes a second pair of knives that extend radially outwards from opposite sides of the central part and at a location which is higher up from the bottom of said central part than the location of the first pair of knives; and wherein the length of the knives of the second pair of knives is about half the length of the knives in the first pair of knives.

2. A cutting device according to claim 1, wherein the knives in the second pair of knives are ground to a cutting edge solely on an underside of each knife, such that said cutting edge is inclined to the direction of movement of the knives when the machine is running.

3. A cutting device according to claim 1, wherein at least a lower part of the central part, where the pairs of knives are placed, has a non-circular cross-sectional shape in a plane perpendicular to the longitudinal axis of said central part.

4. A cutting device according to claim 1, wherein the central part includes a through-penetrating radial hole located on a level at which the cutting device is mounted in a container, wherein said level is above the level of an upper orifice of a tubular member extending upwardly from a bottom of the container.

5. A cutting device according to claim 3, wherein the shape is square.

6. A cutting device according to claim 3, wherein the shape is hexagonal.

7. A cutting device according to claim 3, wherein the shape is octagonal.

* * * * *